United States Patent [19]

Bailey

[11] 4,372,039
[45] Feb. 8, 1983

[54] COIL GUIDE MEMBER FOR COIL INSERTION TOOL

[75] Inventor: Curtis R. Bailey, Dayton, Ohio

[73] Assignee: Machine Products Corporation, Dayton, Ohio

[21] Appl. No.: 220,914

[22] Filed: Dec. 29, 1980

[51] Int. Cl.³ .............................................. H02K 15/06
[52] U.S. Cl. ...................................................... 29/734
[58] Field of Search .................. 29/736, 734, 761, 732, 29/596

[56] References Cited

U.S. PATENT DOCUMENTS

| 3,324,536 | 6/1967 | Hill | 29/734 |
| 3,559,268 | 2/1971 | Droll | 29/732 |
| 3,815,206 | 6/1974 | Smith | 29/736 |

Primary Examiner—Carl E. Hall
Assistant Examiner—P. W. Echols
Attorney, Agent, or Firm—Jacox & Meckstroth

[57] ABSTRACT

A coil guide member as a part of apparatus for insertion of a coil of electric wire into a stator of an electric machine. The coil guide member includes a readily replaceable wire protector element which has extending thin projections or lips which guide a coil of wire into a slot of a stator and which protect the coil of wire during movement of the coil of wire into a slot. Preferably, the thin projections or lips are flexible. This flexibility permits a large degree of tolerance in lamination teeth alignment. The thin projections or lips also permit insertion of a large range of coil wire sizes.

11 Claims, 9 Drawing Figures

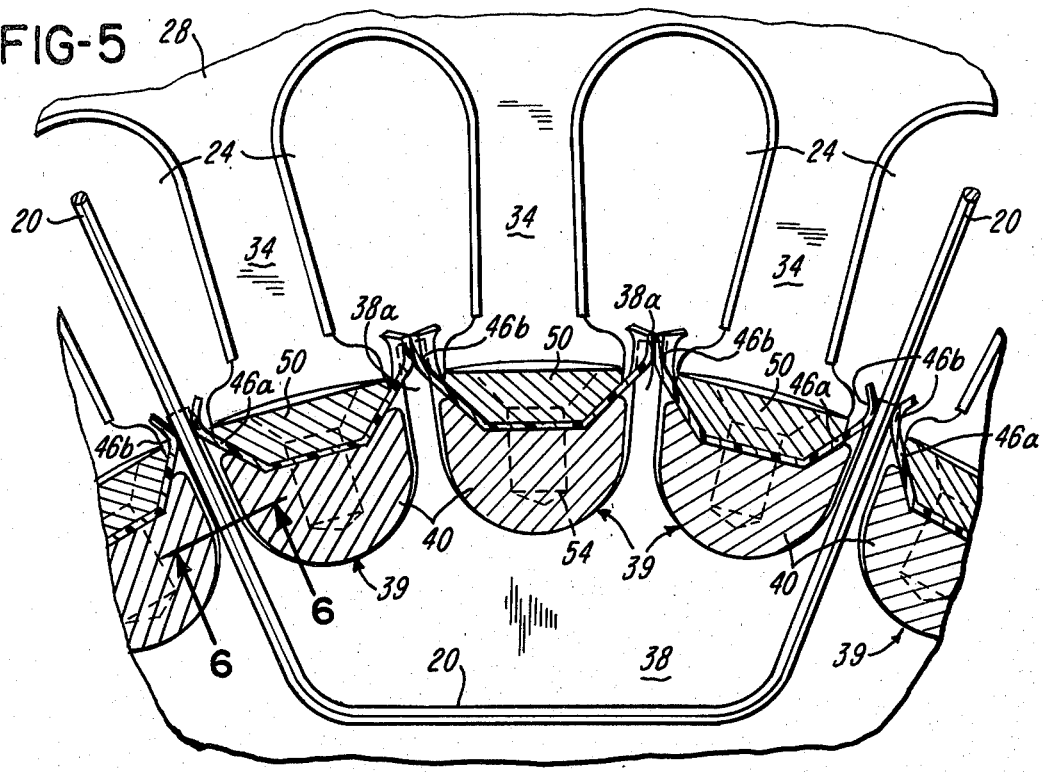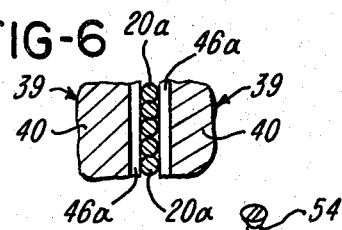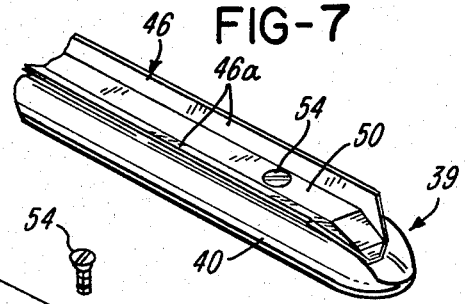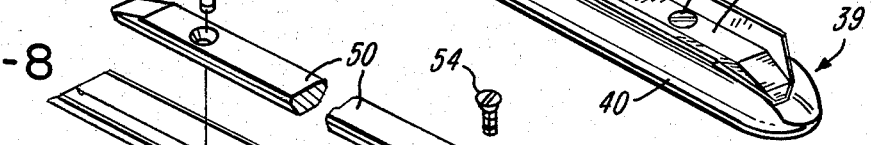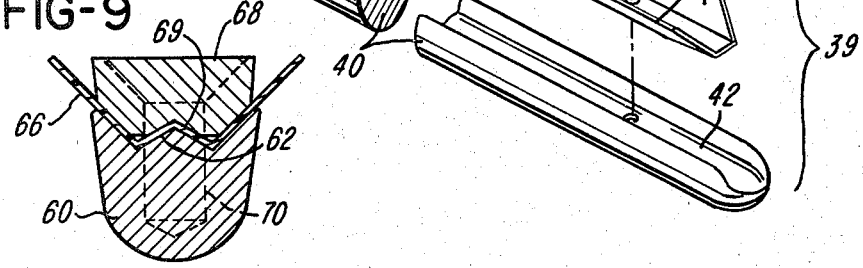

COIL GUIDE MEMBER FOR COIL INSERTION TOOL

BACKGROUND OF THE INVENTION

A coil insertion tool which inserts pre-wound electrical conductor coils into a stator of an electric machine is provided with several elements. The stator has spaced-apart teeth which form coil receiving slots therebetween. Among the most important elements of the coil insertion tool are elongate guide members which are arranged in annular relationship and which guide the coils into the slots of the stator. Customarily there is one coil guide member for each of the teeth of the stator, as each coil guide member is in juxtaposition with one of the teeth of the stator. In the past, such coil guide members are made entirely of rigid metallic material. Such coil guide members are shown in U.S. Pat. Nos. 3,324,536 and 3,559,268.

Such prior art coil guide members have lips or projections which partially cover the sides of the teeth with which they are in contact. The lips must be as thin as practicable in order to provide maximum space between adjacent teeth for coil insertion. However, by necessity the lips of prior art coil guide members have a significant thickness dimension. Therefore, the thickness of the lips or projections of prior art coil guide members is sometimes a limiting factor in regard to the wire size of coils which can be inserted into a given stator. Such prior art coil guide members have other numerous objectionable features and limitations. For example, so far as is known, all prior art coil guide members have rigid lip portions which are subject to wear. When such wear occurs, the coil guide members cannot function properly. Therefore, prior art coil guide members must be discarded. Such coil guide members are relatively costly to produce, and discarding thereof results in significant loss.

Also, such prior art coil guide members being of rigid metal, sometimes cause scratching of the insulation material of the coils as they are inserted into a stator.

It is therefore an object of this invention to provide a coil guide member for a coil insertion tool which inserts pre-wound electric conductor coils into a stator, in which the coil guide member includes lip portions which may be flexible or rigid and which are readily replaceable when wear thereof occurs. Thus, the entire coil guide member does not need to be discarded when wear occurs.

It is another object of this invention to provide a coil guide member which has lip portions which are thinner than those of prior art devices. Therefore, the usable slot gap for wire insertion is greater. Thus, insertion of a larger range of coil wire sizes is possible by use of the structure of this invention.

It is another object of this invention to provide a coil guide member having flexible lip portions which permit greater tolerance in lamination teeth alignment than is possible in prior art coil guide members.

It is another object of this invention to provide such a coil guide member which permits machine insertion of pre-wound electrical coils into a stator of an electrical machine.

It is another object of this invention to provide such a coil guide member which includes flexible elements which permit ease of insertion of pre-wound electrical coils having any one of a large range of wire diameters.

It is another object of this invention to provide such a coil guide member which does not scratch wire insulation as pre-wound coils are guided into stator slots.

Other objects and advantages of this invention reside in the construction of parts, the combination thereof, the method of production and the mode of operation, as will become more apparent from the following description.

BRIEF DESCRIPTION OF THE VIEWS OF THE DRAWINGS

FIG. 5 is a fragmentary sectional view, similar to FIG. 2, and drawn on substantially the same scale as FIG. 2, illustrating a portion of a stator and showing coil guide members of this invention for guiding movement of pre-wound coils into the slots of the stator and showing a portion of a coil as it is guided into the slots of the stator.

FIG. 6 is a diagrammatic sectional view taken substantially on line 6—6 of FIG. 5 and illustrating individual wire members of a coil as the wire members are guided into a coil slot of a stator by coil guide members of this invention.

FIG. 7 is a fragmentary perspective view of a coil guide member of this invention, drawn on substantially the same scale as FIG. 4.

FIG. 8 is an exploded perspective view of a coil guide member of this invention, drawn on substantially the same scale as FIG. 7.

FIG. 9 is a sectional view, drawn on substantially the same scale as FIG. 5, showing another embodiment of a coil guide member of this invention.

DETAILED DESCRIPTION OF THE INVENTION

Figure 1:
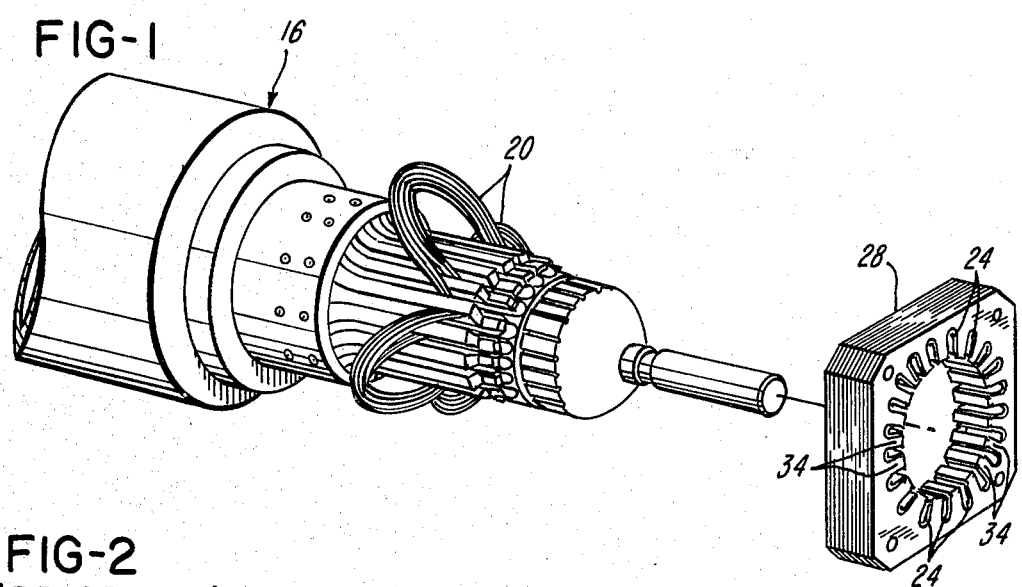
FIG. 1 is a fragmentary perspective exploded view of a typical coil insertion tool showing a stator into which pre-wound coils are inserted.

FIG. 1 illustrates typical electrical coil insertion apparatus which may comprise coil guide members of the prior art or which include coil guide members of this invention. FIG. 1 also shows coils 20 for insertion into slots 24 of a stator 28. The slots 24 are formed by teeth 34 of the stator 28.

Figure 2:
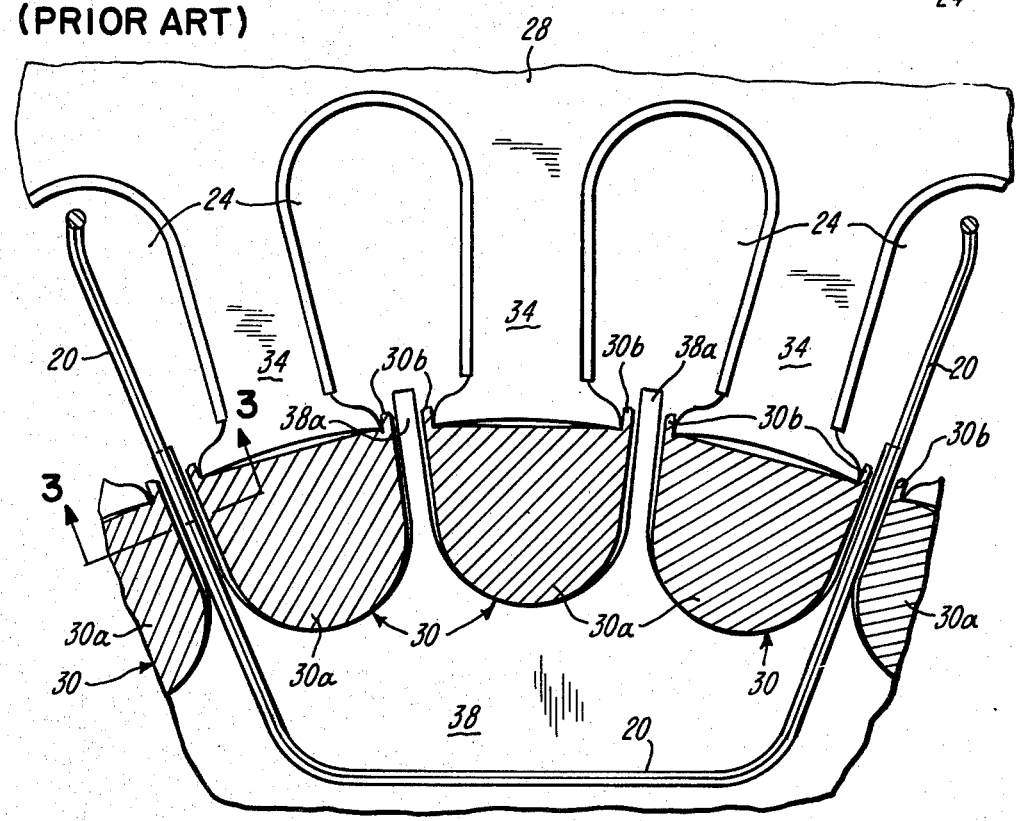
FIG. 2 is a greatly enlarged fragmentary sectional view showing a portion of a stator and coil guide members of a prior art coil insertion tool and a portion of a pre-wound coil for insertion into slots of the stator.
Figure 4:
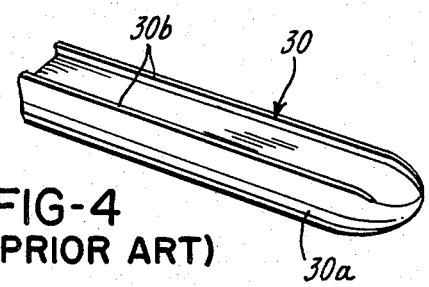
FIG. 4 is a fragmentary perspective view of a coil guide member of the prior art type illustrated in FIG. 2, drawn on a smaller scale than FIGS. 2 and 3.

FIG. 2 shows a portion of the stator 28 and the slots 24 and teeth 34 thereof. This view also shows a portion of a coil 20 as the coil 20 is being inserted into two of the slots 24. FIG. 2 shows a plurality of coil guide members 30 of a prior art type, and FIG. 4 shows an individual coil guide member of the prior art type. Each of the coil guide members 30 has a body portion 30a and a pair of integral extending lips 30b. Each of the coil guide members 30 is positioned along the length of a tooth 34 of the stator 28 and is shown in engagement with its respective tooth 34, as the lips 30b of each guide member 30 extend over a portion of the sides of the respective tooth 34. FIG. 2 also shows portions of a stripper member 38 which is a part of the coil insertion tool 16 and which has projections 38a. Each of the projections 38a moves between adjacent coil guide members 30 as the coils 20 are forced into the slots 24 of the stator 28 by the projections 38a of the stripper member 38.

FIGS. 5-8 illustrate coil guide members 39 of this invention, each of which includes an elongate body 40 which is provided with a channel 42 extending the length thereof. The coil guide members 39 are within and are a part of a coil insertion tool, such as that illustrated in FIG. 1. Positioned within the channel 42 of the coil guide member 39 is an elongate wire protector member 46 which extends the length of the channel 42 and which has very thin lips or projections 46a extending from the channel 42. The lips or projections 46a may be flexible or rigid. Preferably, the wire protector member 46, with its lips or projections 46a, is of any suitable durable flexible material, and is preferably of a plastics material such as nylon, Mylar, or the like. Positioned upon the central portion of the wire protector member 46, within the channel 42, is an elongate retainer member 50, which extends substantially the length of the wire protector member 46 and which is secured to the body 40 by means of screws 54, or the like, which extend through the retainer member 50, through the wire protector member 46, and into the body 40.

As illustrated in FIG. 5, the coil guide members 39 are positioned in engagement with the teeth 34 of the stator 28 and are retained in such position in any suitable manner, not shown. The lips 46a of each of the wire protector members 46 of each coil guide member 39 may extend from the body 40 any suitable or desired length and may be of any suitable or desired shape to cover a portion of the tooth with which the coil guide member 39 is in engagement. In FIG. 5 the lips 46a are shown as extending from the body 40 so that the lips 46a of adjacent coil guide members 39 may be in engagement one with the other. The lips 46a are also shown in FIG. 5 as having a curved outer portion 46b. However, the lips 46a may be of a dimension which is less or longer than necessary for engagement between lips 46a of adjacent coil guide members 39, and the lips 46a may be of any desired shape.

Figure 3:
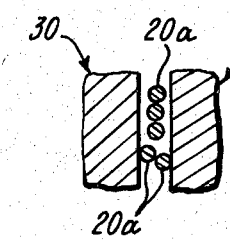
FIG. 3 is a diagrammatic sectional view taken substantially on line 3—3 of FIG. 2 and illustrating movement of individual wire members of a coil as the wire members are guided by guide members of a prior art type. This view also illustrates the manner in which individual wires of a coil can become pinched during insertion by a coil insertion tool which includes prior art coil guide members.

As illustrated in FIG. 5, as the projections 38a of the stripper member 38 force the coils 20 into the slots 24 of the stator 28, the coils 20 force lips 46a of adjacent coil guide members 39 to separate, as the lips 46a flexibly move. Therefore, individual wires 20a of the coils 20 may easily arrange themselves in substantially single-file order, as illustrated in FIG. 6, to move easily and readily into the slots 24, without pinching or jamming action. As stated above, such pinching or jamming of wires of a coil thereof may occur in the use of conventional coil guide members 30 which are rigid and do not permit rearrangement or relative movement of wires of a coil as the coils 20 approach a slot 24 as illustrated in FIG. 3. Thus, conventional coil guide members such as illustrated in FIGS. 2 and 4 limit the sizes of wire which may be inserted by a given coil insertion tool such as the tool illustrated in FIG. 1.

Furthermore, the lips or projections 46a of a coil guide member 39 of this invention being preferably of a flexible plastics material, such as nylon or the like, do not scratch the insulation on the wires in the coils 20 as the coils 20 come into engagement with the lips 46a as the lips 46a guide the coils 20 into the coil slots 24 of the stator 28.

Due to the fact that the lips or projections 46a can be very thin in dimension and thinner than lips in known prior art devices, the usable slot gap dimension for wire insertion is greater. Therefore, insertion of a larger range of coil wire sizes is possible in the use of coil guide members of this invention.

Due to the fact that the lips or projections 46a are thin, providing a relatively large gap between adjacent teeth, mechanical insertion of pre-wound coils into a stator is possible with the use of coil guide members of this invention.

Due to the fact that a wire protector member 46 of a coil guide member 39 of this invention is easily attachable to the body 40 of the coil guide member 39, replacement of a wire guide member 39 is not necessary when wear of the lips 46a occurs. The protector member 46 is readily replaced when wear occurs, and discarding of an entire coil guide member 39 is not necessary when wear occurs. As stated above, the lips or projections 46a of a wire protector member 46 of the coil guide member 39 of this invention are preferably of flexible material. However, it is to be understood that the lips 46a may, if desired, be of rigid material.

FIG. 9 shows another embodiment of a coil guide member of this invention which includes an elongate body 60, which, generally, may be similar to the elongate body 40 shown in FIG. 8. The elongate body 60 has a corrugated support surface 62, upon which rests a wire protector member 66, which is preferably of flexible plastics material, such as nylon, Mylar, or the like, and which has a central portion formed to the configuration of the corrugated support surface 62 of the elongate body 60.

Resting upon the central portion of the wire guide member 66 is a retainer member 68 provided with a corrugated engagement surface 69, which is complementary to the corrugated support surface 62 of the elongate body 60. One or more screws 70 extend through the retainer member 68, through the central portion of the wire protector member 66 and into the elongate body 60 and secures the elongate body 60, the wire protector member, and the retainer member 68 together to form a unitary coil guide member.

Although the preferred embodiments of a coil guide member of this invention have been described, it will be understood that within the purview of this invention various changes may be made in the form, details, proportion and arrangement of parts, the combination thereof, and the manner of use, which generally stated consist in a structure within the scope of the appended claims.

The invention having thus been described, the following is claimed:

1. In apparatus for insertion of a pre-wound coil of electrical conductor wire into an electric machine stator provided with spaced-apart internal teeth forming slots therebetween, a coil guide member, the coil guide member being positioned in juxtaposition with one of the teeth of the stator along the length thereof to guide a portion of a coil of wire into a slot adjacent said one of the teeth, the coil guide member comprising an elongate body provided with a channel therein which extends substantially the length thereof, a wire protector member having a part within the channel and extending substantially the length of the channel, the wire protector member having flexible projections extending from the channel and in covering relationship with portions of the tooth with which the coil guide member is in juxtaposition, for protection of a coil as the coil is guided by the coil guide member into a slot adjacent the tooth.

2. The apparatus of claim 1 in which the wire protector member is removably attached to the elongate body.

3. In coil insertion apparatus for insertion of a pre-wound coil of electrical wire into the stator of an electrical machine in which the stator has internal salient teeth which form slots therebetween, a coil guide member comprising an elongate body member having an axial length, a separate elongate wire protector member removably fastened to said body member and extending substantially the length of said body member, said wire protector member including flexible relatively thin projection portions of plastics material extending from the body member, the coil guide member being positioned in juxtaposition with one of the teeth of the stator along the length thereof as the projection portions of plastics material partially cover portions of said one of the teeth, to guide movement of a part of a pre-wound coil of electrical wire into a slot which is adjacent said one of the teeth.

4. In apparatus for inserting pre-wound coils of electrical wire into a magnetizable member of an electric machine which has a plurality of teeth forming slots therebetween, a plurality of coil guide members, each of the coil guide members being in juxtaposition with one of the teeth of the magnetizable member, each of the coil guide members including an elongate body member having an axial length, a separate wire protector member removably fastened to the elongate body member and extending the length thereof, each wire protector member having spaced-apart thin lip portions of flexible plastics material extending from the body member along the length thereof and in covering relationship with a portion of a tooth with which the coil guide member is in juxtaposition.

5. In the apparatus of claim 4 in which the extending thin lip portions of the wire protector members of the coil guide members have a dimension such that the lip portions of adjacent coil guide members are normally in engagement one with the other.

6. In the apparatus of claim 4 in which the extending thin lip portions of adjacent wire protector members of the coil guide members are in juxtapositon.

7. In the apparatus of claim 4 in which the extending thin lip portions of the wire portector members of the coil guide members are curved.

8. In the apparatus of claim 4, in which the entire wire protector member is of a flexible plastics material.

9. In the apparatus of claim 4, in which the elongate body member has a corrugated support surface.

10. In apparatus for inserting pre-wound coils of electrical wire into a magnetizable member of an electric machine which has a plurality of teeth forming slots therebetween, a plurality of coil guide members, each of the coil guide members being in juxtaposition with one of the teeth of the magnetizable members, each of the coil guide members including an elongate body member, a wire protector member removably attached to the elongate body member and extending the length thereof, each wire protector member having spaced-apart thin lip portions extending from the body member along the length thereof and in covering relationship with a portion of a tooth with which the coil guide member is in juxtaposition, and an elongate retainer member, the wire protector member having a central portion sandwiched between the elongate body member and the elongate retainer member.

11. In the apparatus of claim 10 in which the elonagate body member and the elongate retainer member have complementary corrugated surfaces.

* * * * *